(12) United States Patent
Brassfield et al.

(10) Patent No.: US 7,377,746 B2
(45) Date of Patent: May 27, 2008

(54) AIRFOIL COOLING CIRCUITS AND METHOD

(75) Inventors: Steven Robert Brassfield, Cincinnati, OH (US); Ching-Pang Lee, Cincinnati, OH (US); Roger Lee Doughty, Pleasant Plain, OH (US); Richard William Jendrix, Liberty Township, OH (US); Cory Michael Williams, Maineville, OH (US)

(73) Assignee: General Electric Company, Schenectady, NY (US)

( * ) Notice: Subject to any disclaimer, the term of this patent is extended or adjusted under 35 U.S.C. 154(b) by 543 days.

(21) Appl. No.: 11/062,001

(22) Filed: Feb. 21, 2005

(65) Prior Publication Data

US 2008/0080979 A1    Apr. 3, 2008

(51) Int. Cl.
*F03D 11/02* (2006.01)
(52) U.S. Cl. .............. 416/97 R; 415/115; 29/888.024; 29/888.025
(58) Field of Classification Search ................ 415/115; 416/97 R; 29/888.02, 888.024, 888.025
See application file for complete search history.

(56) References Cited

U.S. PATENT DOCUMENTS

| 5,429,877 | A | * | 7/1995 | Eylon ...................... 29/889.72 |
| 5,498,132 | A | * | 3/1996 | Carozza et al. ........... 416/97 R |
| 5,660,524 | A | * | 8/1997 | Lee et al. ................. 416/97 R |
| 5,702,232 | A | * | 12/1997 | Moore ......................... 416/95 |
| 5,720,431 | A |   | 2/1998 | Sellers et al. |
| 5,931,638 | A |   | 8/1999 | Krause et al. |
| 6,162,347 | A | * | 12/2000 | Fleck .................... 29/889.721 |
| 6,705,836 | B2 | * | 3/2004 | Bourriaud et al. ........ 416/97 R |
| 7,011,502 | B2 | * | 3/2006 | Lee et al. ................. 416/97 R |

* cited by examiner

*Primary Examiner*—Igor Kershteyn
(74) *Attorney, Agent, or Firm*—Adams Intellectual Property Law, P.A.; William Scott Andes, Esq.

(57) ABSTRACT

An airfoil is disclosed having at least first and second cast, axially-stacked internal airflow cooling circuits. Each circuit defines multiple air flow passages positioned laterally between a pressure sidewall side and a suction sidewall side of respective ones of the circuits. Each of the circuits is formed by a separate casting core. Methods of forming a axially-stacked core and an airfoil are also disclosed.

18 Claims, 9 Drawing Sheets

AIRFOIL COOLING CIRCUITS AND METHOD

GOVERNMENT INTERESTS

This invention was made with government support under PRDA-7 government contract No. F33615-C-2212 awarded by the Department of Defense. The government has certain rights to this invention.

TECHNICAL FIELD AND BACKGROUND OF THE INVENTION

This invention relates generally to gas turbine engines, and more particularly to internally cooled airfoils used in gas turbine engines.

Gas turbine engines, such as aircraft jet engines, include many components (e.g., turbines, compressors, fans and the like) that utilize airfoils. Turbine airfoils, such as turbine blades and nozzle vanes are exposed to the highest operating temperatures and thus typically employ internal cooling to keep the airfoil temperatures within specified design limits. The design limits define an acceptable balance between factors such as operating efficiency, wear longevity and heat tolerance.

A turbine rotor blade, for example, has a shank portion that is attached to a rotating turbine rotor disk and an airfoil blade portion that extracts energy from the hot gases exiting the engine's combustor. The airfoil includes a blade root that is attached to the shank and a blade tip that defines the free end of the blade. The airfoil of the turbine rotor blade is cooled by air, typically bled from the engine's compressor, that passes through an internal circuit in the airfoil. The air enters near the airfoil blade root and exits near the airfoil blade tip, as well as through film cooling holes near the airfoil blade's leading edge and through trailing edge cooling holes. Known turbine blade cooling circuits include a plurality of radially-oriented passageways that are series-connected to produce a serpentine flow path, thereby increasing cooling effectiveness by extending the length of the coolant flow path.

It is also known to provide additional, unconnected passageways adjacent to the serpentine cooling circuit. Turbine rotor blades with internal cooling circuits are typically manufactured using an investment casting process commonly referred to as the "lost wax" process. This process comprises enveloping a ceramic core defining the internal cooling circuit in wax shaped to the desired configuration of the turbine blade. The wax assembly is then repeatedly dipped into a liquid ceramic solution, causing a hard ceramic shell to incrementally form on the surface of the assembly. When the proper thickness is achieved, the wax is melted out of the shell so that the remaining mold consists of the internal ceramic core, the external ceramic shell and the intermediate empty space previously filled with wax. The empty space is then filled with molten metal. After the metal cools and solidifies, the external shell is broken and removed, exposing the metal that has taken the shape of the void created by the removal of the wax. The internal ceramic core is dissolved via a leaching process. The metal component now has the desired shape of the turbine blade and the formed internal cooling circuit.

In casting turbine blades with serpentine cooling circuits, the internal ceramic core is formed as a serpentine element having a number of long, thin branches. This presents the challenge of making the core sturdy enough to survive the pouring of the metal while maintaining the stringent requirements for positioning the core. Moreover, some prior art airfoils include three cooling circuits, a leading edge circuit, a mid chord circuit and a trailing edge circuit. The mid chord circuit is an axial serpentine circuit flowing from the trailing edge to the leading edge, and the leading edge and trailing edge circuits are impingement-type circuits.

In this design, the pressure sidewall and the suction sidewall of the mid chord circuit contact the same cooling air at the same temperature. This design is relatively easy to cast, but does not provide sufficient flexibility to control the temperatures of the pressure sidewall and the suction sidewall effectively and efficiently.

Other prior art designs provide separate flow control on the pressure side and the suction side. These designs require an assembly core within the mid chord circuit. The assembled mid chord circuit is then assembled with other circuits to for a complete casting core.

Accordingly, there is a need for a turbine airfoil in which different cooling circuit combinations can be formed in one ceramic core, that provides more control of local temperatures on various parts of the airfoil, and that can be cast using conventional processes.

BRIEF DESCRIPTION OF THE INVENTION

According to one embodiment of the invention, an airfoil is disclosed having at least first and second cast, axially-stacked internal airflow cooling circuits. Each circuit defines multiple air flow passages positioned laterally between a pressure sidewall side and a suction sidewall side of respective ones of the circuits. Each of the circuits is formed by a separate casting core. Methods of forming a axially-stacked core and an airfoil are also disclosed.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
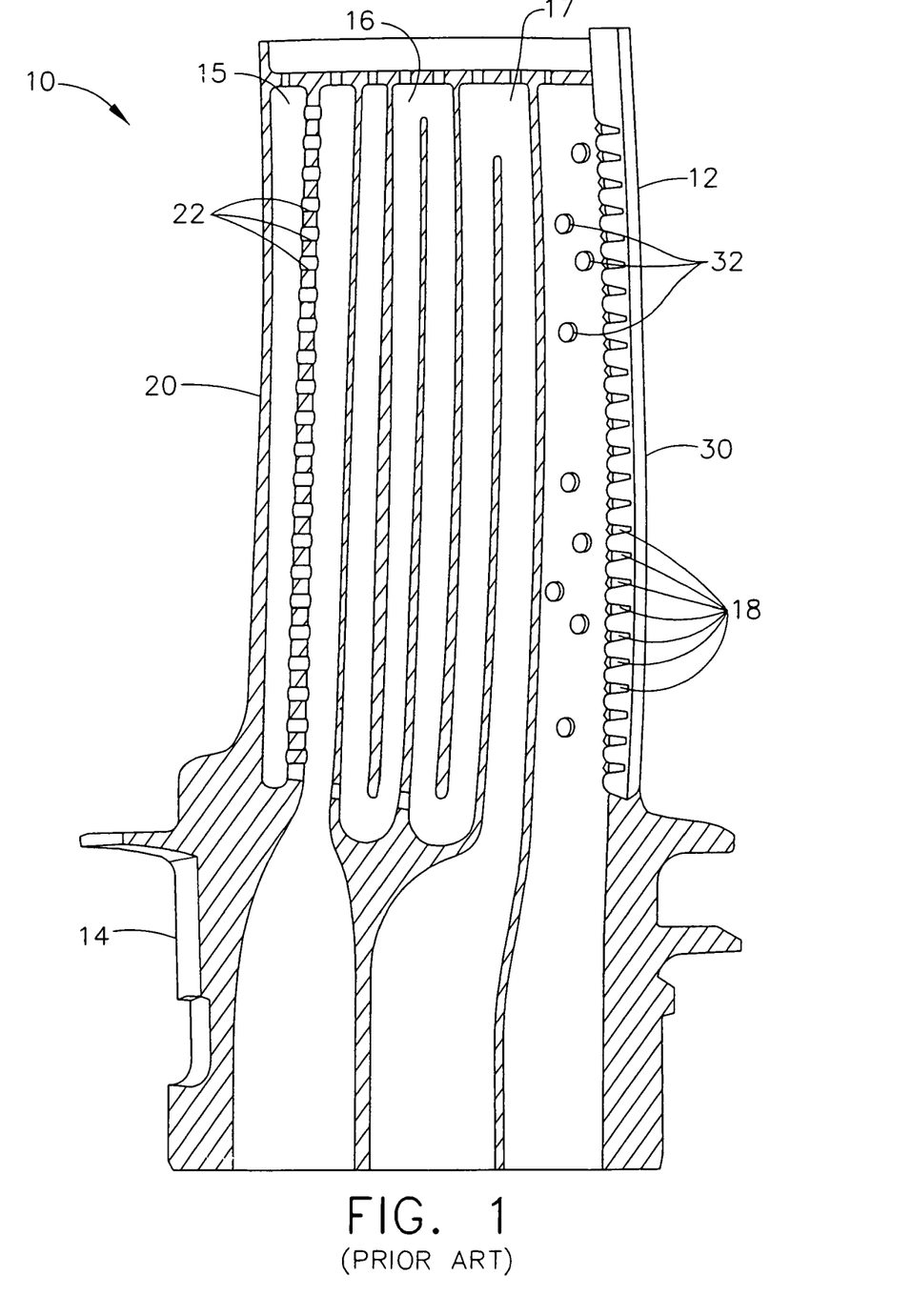
FIGS. 1-4 are views of prior art airfoils with internal cooling circuits.
Figure 2:
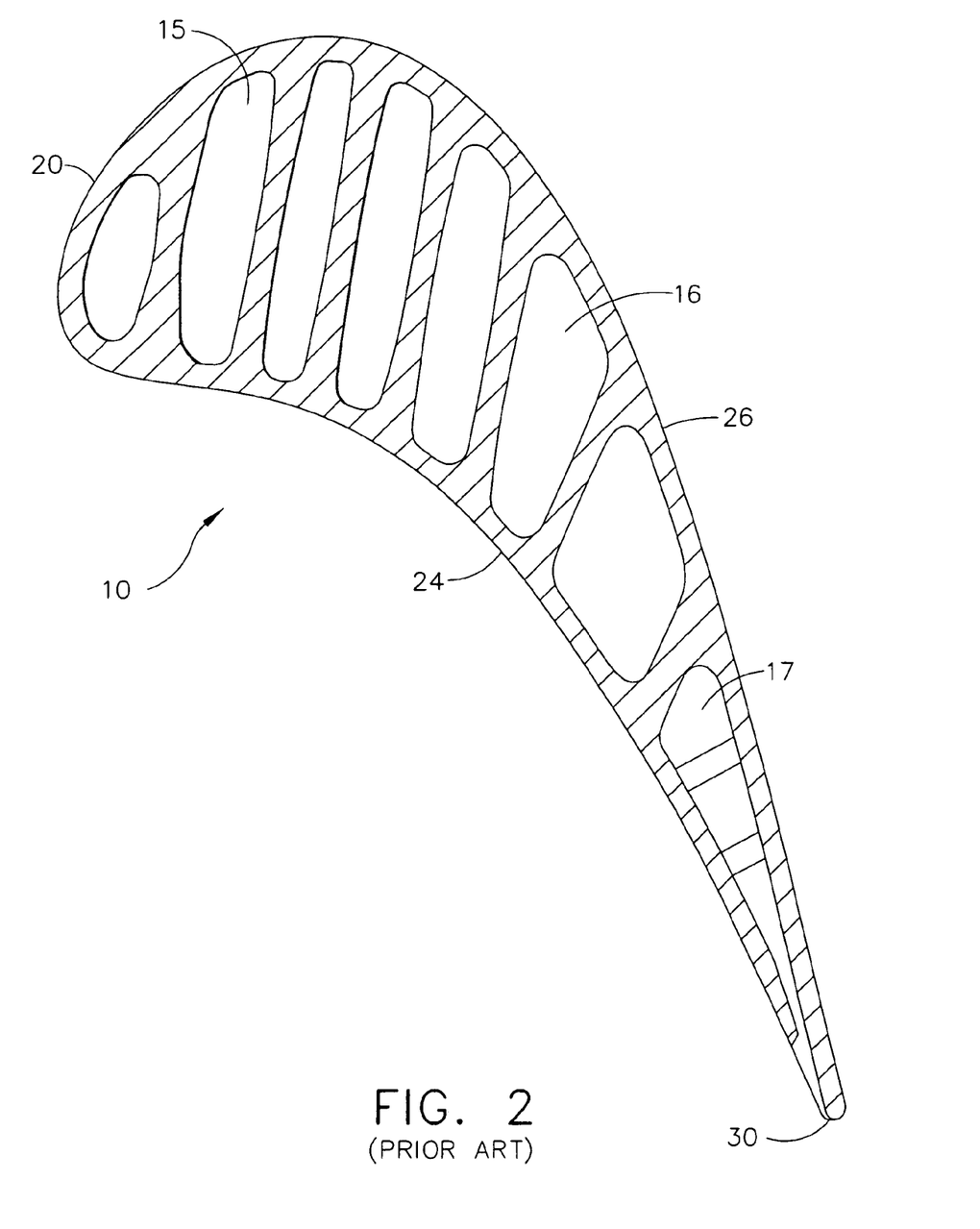

Referring now specifically to the drawings, prior art airfoils incorporating internal cooling circuits are shown in FIGS. 1-4. FIGS. 1 and 2 illustrate a conventional prior art turbine blade 10 for a gas turbine engine. The blade 10 includes an airfoil section 12 and a root 14 that is attached with other blades 10 to a rotatable turbine hub, not shown, and projects outwardly from the hub into a flowpath from the engine's combustion chamber. Blade 10 includes three cooling circuits—a leading edge circuit 15, a mid chord circuit 16, and a trailing edge circuit 17. The leading edge circuit 15 is an impingement-type circuit whereby the leading edge 20 is cooled through impingement of air through holes 22 on the interior of the leading edge 20.

The mid chord circuit 16 is an axial serpentine-type circuit. In this design, the pressure sidewall 24 and the suction sidewall 26 are cooled by contact with the same air at the same temperature. This design is easy to cast, but does not provide the flexibility necessary to control the temperatures of the pressure sidewall 24 and suction sidewall 26 effectively.

The trailing edge circuit 17 is a radial convection channel for air passage with pins 32 and pressure side trailing edge cooling slots 18.

To further improve blade design and performance, local control of wall temperature is important.

Figure 3:
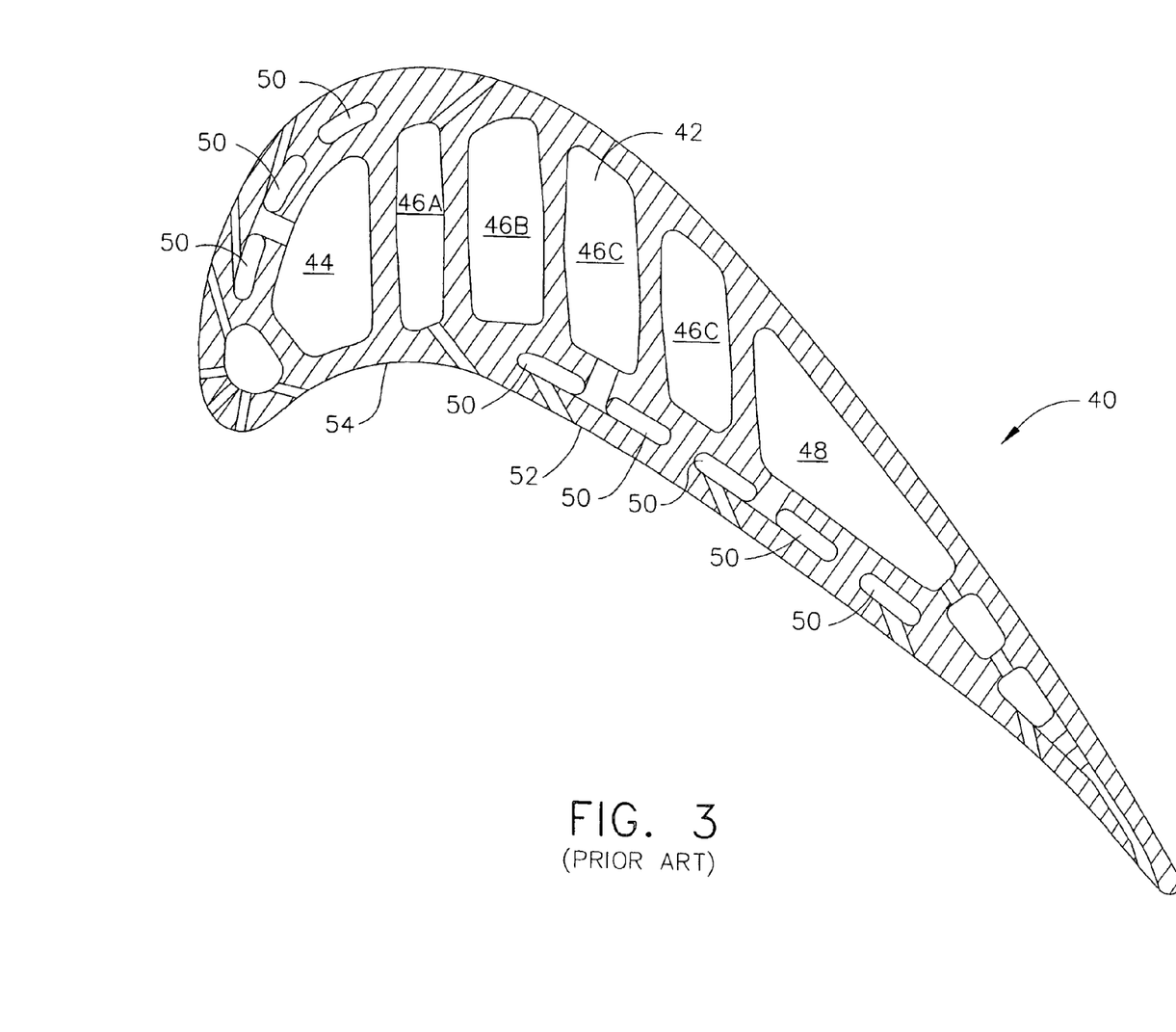
Figure 4:
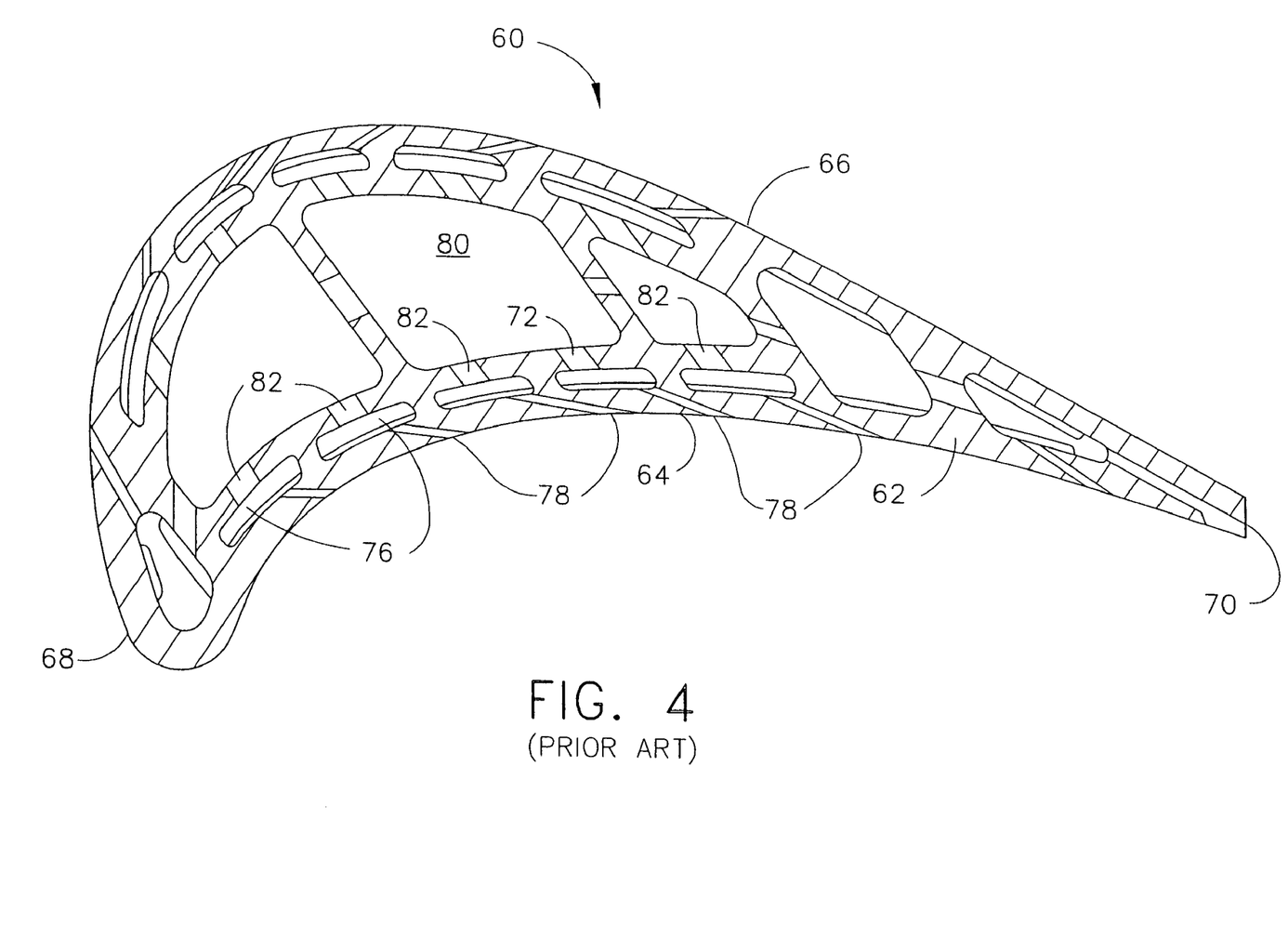

Prior art advanced design turbine blades are shown in FIGS. 3 and 4. These blades provide separate flow control on the pressure and suction sides of the blade to enable more precise local control of the wall temperature.

The blade 40 shown in FIG. 3 is described in U.S. Pat. No. 5,931,638, and includes a primary cooling system 42 with a series of medial passages 46A, 46B, 46C, and 48, and auxiliary cooling conduits 50 that communicate with the medial passages 46A-C and 48. The conduits 50 are parallel to and radially coextensive with the medial passages 46A-C, 48 and are disposed in the peripheral pressure sidewall 54. The conduits 50 are positioned in zones of high heat load so that their effectiveness is optimized.

FIG. 4 illustrates an internally-cooled blade 60, and is described in U.S. Pat. No. 5,720,431. Blade 60 includes an outer wall 62 defining a pressure surface 64, a suction surface 66, a leading edge 68 and trailing edge 70. The blade 60 is cast in a double wall configuration wherein the inner wall 72 is generally coextensive and parallel to the outer wall 62 but is spaced therefrom to define a radially extending passages 76. This passage 76 continually feeds cooling air to the film cooling holes 78 and to the blade tip.

Cooling air is also continuously flowing to the central cavity, which comprises a radially-extending passage 80 that replenishes the supply of cooling air as it is being exhausted through film cooling holes 78 by communication through replenishment holes 82.

The designs in FIGS. 3 and 4 require an assembly core within the mid chord area of blade, which is then assembled with other laterally arranged circuit cores to form a completed casting core. These assemblies can be quite complex and difficult to form because of the requirement of multiple cores.

Figure 5:
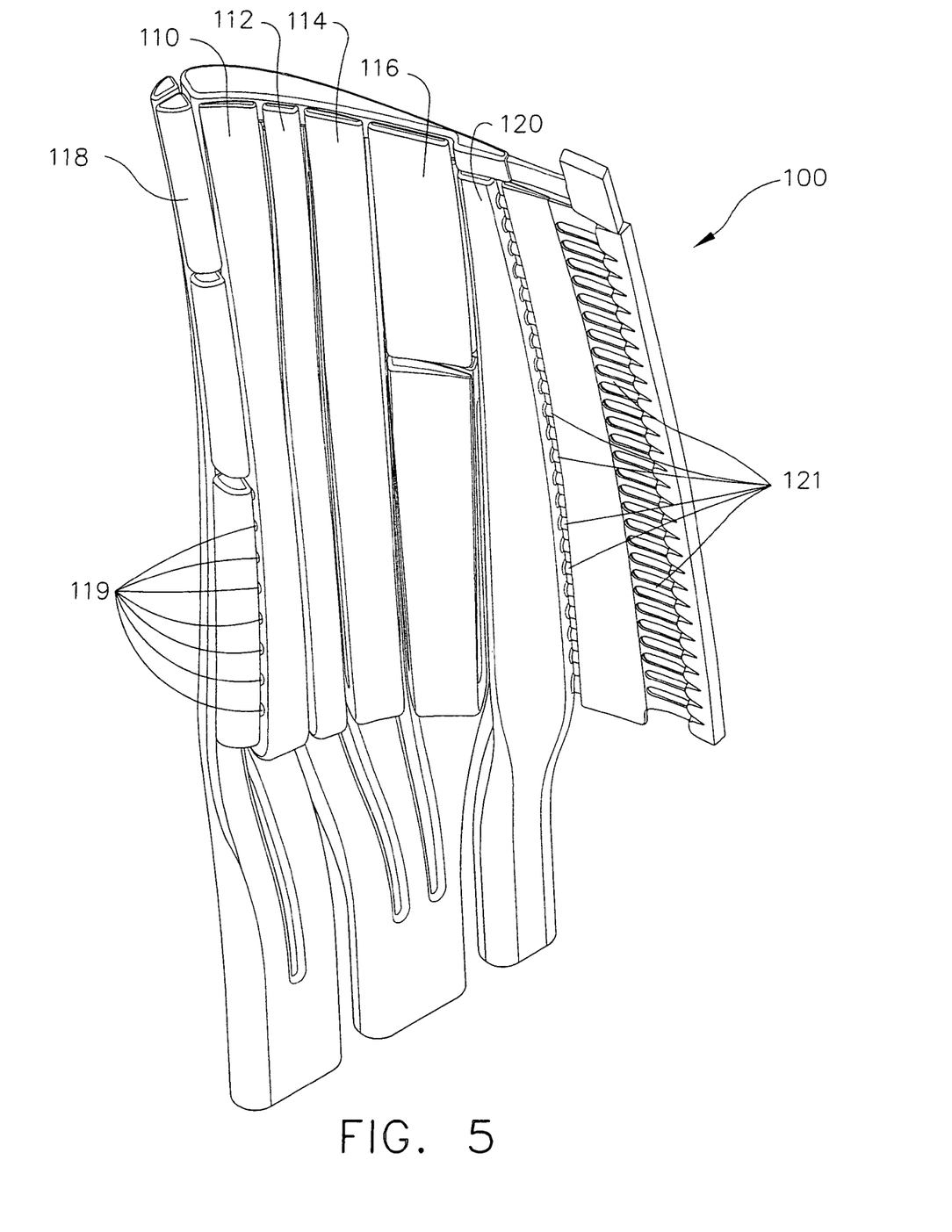
FIG. 5 is a perspective view of a stacked core defining a cooling circuit according to an embodiment of the present invention.
Figure 6:
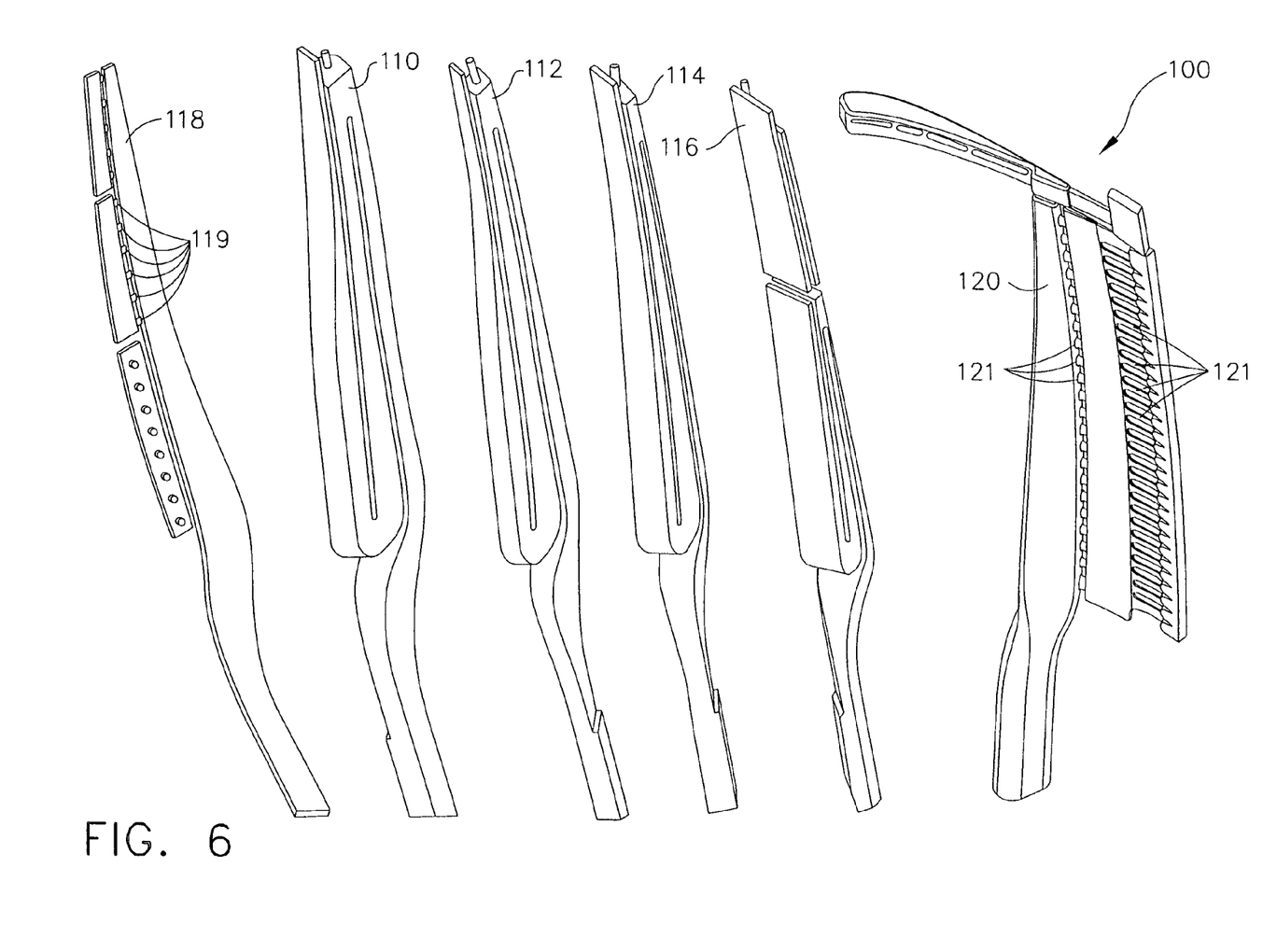
FIG. 6 is an exploded perspective view of the stacked core shown in FIG. 5.
Figure 7:
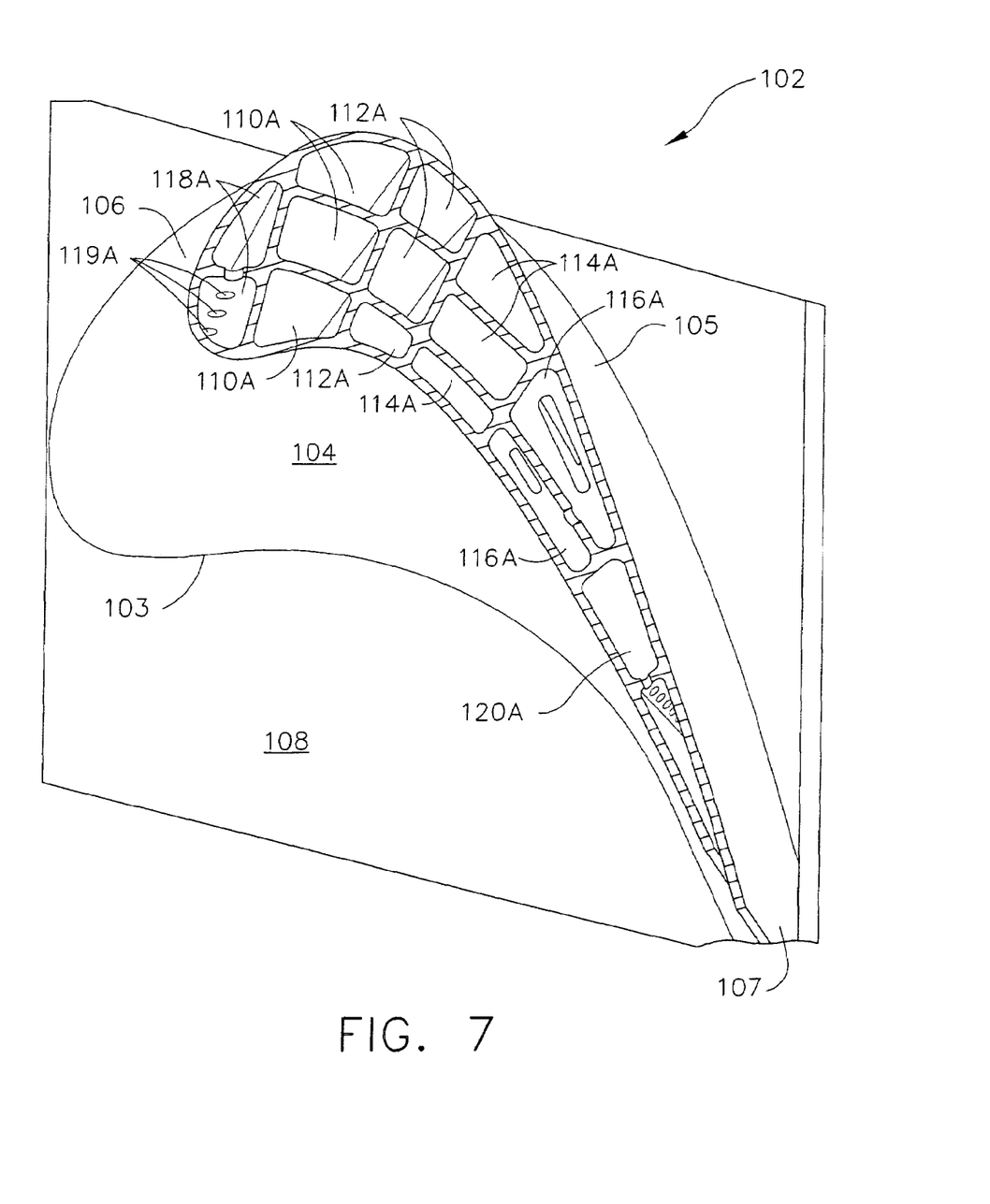
FIG. 7 is a top cross-sectional perspective view of an airfoil fabricated from the core shown in FIGS. 5 and 6.

Referring now to FIGS. 5, 6 and 7, a stacked airfoil casting core 100 according to an embodiment of the invention is shown in FIG. 5. In this configuration, an airfoil in the form of a turbine blade 102, see FIG. 7, is formed using a lost wax, investment casting process. The stacked casting core 100, fabricated from a ceramic material, is enveloped in wax shaped to the desired configuration of the blade 102. The wax assembly is then repeatedly dipped into a liquid ceramic solution, causing a hard ceramic shell to incrementally form on the surface of the stacked core 100. When the proper thickness is achieved, the wax is melted out of the shell so that the remaining mold consists of the stacked ceramic core 100, the external ceramic shell and the empty space therebetween, previously filled with wax. The empty space is then filled with molten metal. After the metal cools and solidifies, the external shell is broken and removed, exposing the metal that has taken the shape of the void created by the removal of the wax. The internal ceramic core is dissolved via a leaching process. The metal component now has the desired shape of the turbine blade 102, and the formed, internal cooling circuit.

The individual components of the novel ceramic core 100 are shown in FIG. 5. The complete ceramic core 100 includes four ceramic, axially-stacked circuit cores 110, 112, 114 and 116, a ceramic leading edge core 118 and a ceramic trailing edge core 120. By "axial" is meant that the cores are stacked along the axis of the blade 102 extending between the leading edge 106 and the trailing edge 107.

The leading edge core 118 and the trailing edge core 120 are each formed with various pins, for example, pins 119 and 121, that, when the casting process is completed, form airflow passages 119A and 121A, as shown in FIG. 7.

The circuit cores 110, 112, 114 and 116 are individually shaped as required in accordance with the final shape of the blade 102 and, in the embodiment shown in FIGS. 5 and 6, define respective serpentine shapes having at least first and second 180 degree turns. As may be appreciated by reference to FIGS. 6 and 7, the serpentine shapes extend radially-outwardly adjacent the suction sidewall side of a root 103 of the blade 102. The first 180 degree turn is positioned at a tip of the blade 102. The serpentine shape extends radially-inwardly to a center passage of the blade 102, and the second 180 degree turn is positioned at the root of the blade. The serpentine shape extends radially-outwardly adjacent the pressure sidewall side 104 of the blade 102. When the molding process is completed, the voids remaining when the circuit cores 110, 112, 114 and 116 are removed define serpentine air flowpaths of the blade 102.

FIG. 7 shows a completed blade 102. The blade 102 includes the root 103, pressure sidewall 104, suction sidewall 105, leading edge 106, trailing edge 107, and a platform 108. The cross-sectioned portion of blade 102 clearly shows the air flow passages 110A, 112A, 114A and 116A. The leading edge core 118 forms the leading edge flow passages 118A and the ceramic trailing edge core 120 forms a trailing edge flow passage 120A.

Figure 8:
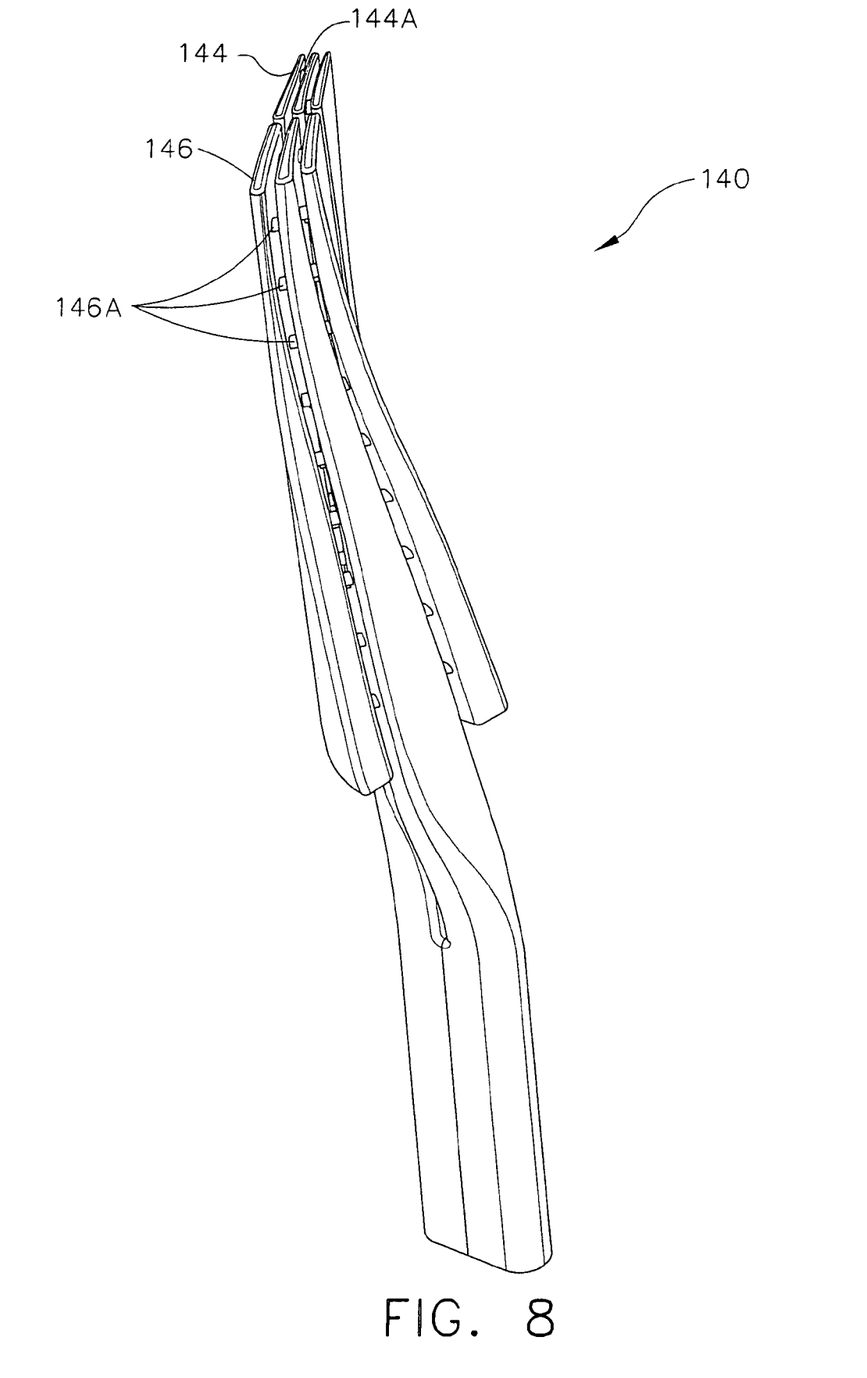
FIG. 8 is a perspective view of a core defining a lateral impingement stacked cooling circuit.
Figure 9:
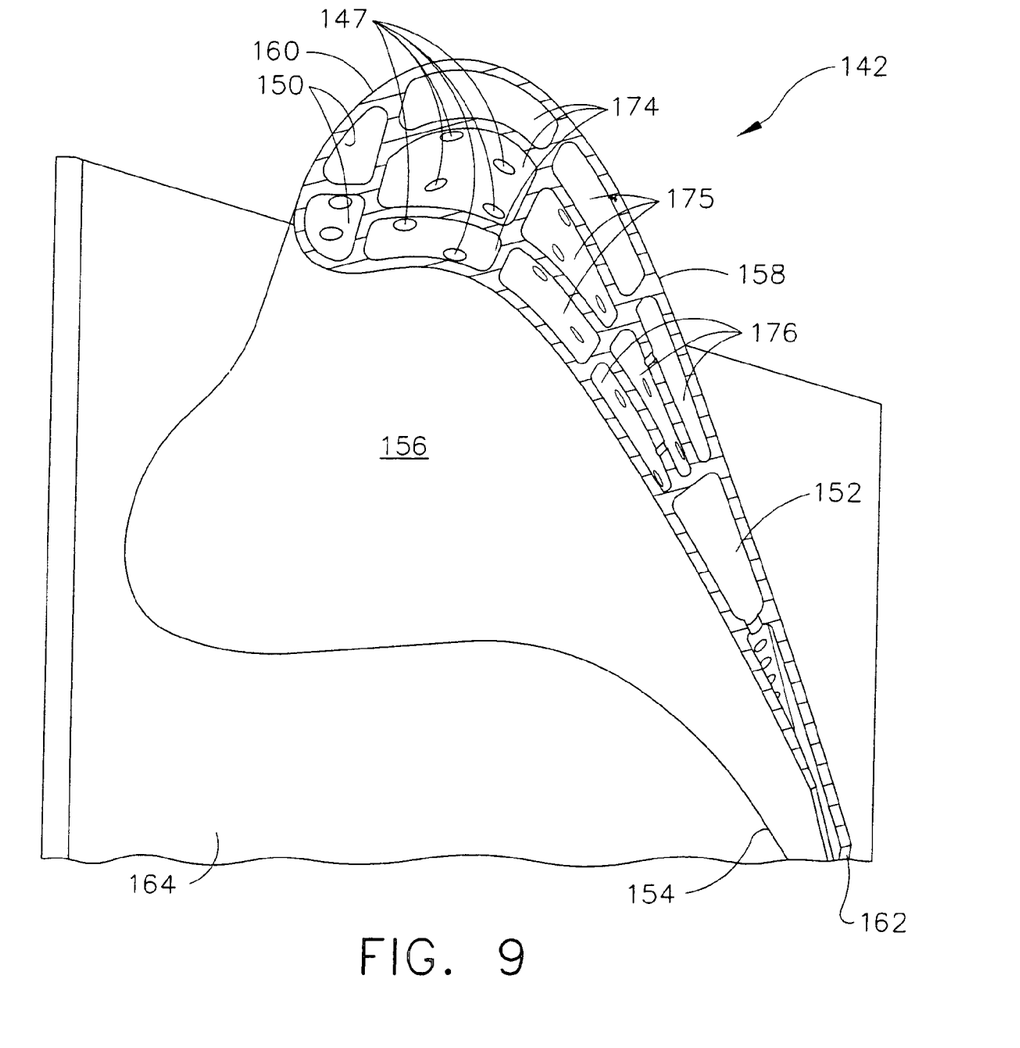
FIG. 9 is a top cross-sectional perspective view of an airfoil made utilizing the core shown in FIG. 8.

Referring now to FIGS. 8 and 9, a lateral impingement stacked core 140 is shown. An airfoil in the form of a turbine blade 142, see FIG. 9, is formed using the lost wax, investment casting process as described above, the stacked core 140 being fabricated from a ceramic material, also as described above. The stacked core 140 includes at least two circuit cores 144, 146 that are stacked axially together with leading edge and trailing edge cores, not shown, for form completed stacked core.

The circuit cores 144, 146 include pins 144A, 146A. As is shown in FIG. 9, when the molding process is complete, the voids formed by the pins 144A, 146A define holes 147. The ceramic, axially-stacked circuit cores 144, 146, and a third circuit core, not shown in FIG. 8, when removed as described above, leave three parallel sets of air flow passages 174, 175, and 176. As with blade 102, blade 142 is fabricated with a leading edge core, not shown, forming leading edge air flow passages 150, and a ceramic trailing edge core, not shown, forming a trailing edge air flow passage 152.

The blade 142 includes a root 154, a pressure sidewall 156, a suction sidewall 158, a leading edge 160, a trailing edge 162, and a platform 164.

Air flowing radially outwardly along the length of the blade 142 through the center flow passages exit through holes 147 into the pressure side and suction side flow passages and impinges against the inner walls of the pressure sidewall 156 and the suction sidewall 158 to achieve a cooling effect. The air then exits through film cooling holes and tip holes, not shown.

Various combinations of serpentine circuits and impingement circuits can be combined by axial stacking cores to achieve both types of cooling in a single airfoil. Moreover, the serpentine circuits and impingement circuits may create air flow from the pressure to the suction side or from the suction to the pressure side of the airfoil. The combination lateral serpentine/lateral impingement airfoil is preferably formed using the same lost wax, investment casting techniques described above.

Since multiple circuits, and multiple types of circuits can be easily formed into one ceramic core, relatively complicated airfoil cooling designs can be cast using known casting techniques with a very low defect rejection rate.

A stacked airfoil cooling circuit, and related airfoils, blades and methods are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An airfoil, comprising at least first and second cast, axially-stacked circuits, each circuit including multiple serpentine air flow passages positioned laterally between a pressure sidewall side and a suction sidewall side of respective ones of the circuits, wherein the serpentine circuits are positioned in a mid chord region of the airfoil and the respective serpentine air flow passages are defined by at least first and second 180 degree turns therein, and further wherein the serpentine airflow passages extend radially-outwardly adjacent the suction sidewall side of a root of the airfoil, the first 180 degree turn is positioned at a tip of the airfoil, the serpentine air flow passages extend radially-inwardly to a center passage of the airfoil, the second 180 degree turn is positioned at the root of the airfoil, and the serpentine air flow passages extend radially-outwardly adjacent the pressure sidewall side of the airfoil.

2. An airfoil according to claim 1, wherein the airfoil comprises a turbine blade.

3. An airfoil according to claim 1, further comprising first and second double-side lateral impingement circuits positioned in a mid chord region of the airfoil and defining a central passage adapted for cooling air flow therethrough and through holes in opposing central passage sidewalls and into impingement with suction side and pressure side passages, the first and second impingement circuits defining an air flow passage to an exit for air flow through film cooling holes and tip holes in the airfoil.

4. An airfoil according to claim 3, wherein each impingement circuit is formed from a single casting core.

5. An airfoil according to claim 3, wherein the airfoil comprises a turbine blade.

6. A method of forming a cooling core for an airfoil, comprising the steps of;
  (a) forming at least first and second circuit cores, each circuit core adapted to define multiple air flow passages positioned between a pressure sidewall side and a suction sidewall side of respective ones of the circuit cores;
  (b) axially-stacking the circuit cores; and
  (c) positioning the axially-stacked circuit cores between a leading edge core and a trailing edge core to define a complete cooling core.

7. A method according to claim 6, and including the steps of:
  (a) positioning the circuit cores in a mid chord region of the airfoil; and
  (b) providing a serpentine air flow passage in the circuit cores defined by at least first and second 180 degree turns therein.

8. A method according to claim 7, and including the steps of:
  (a) extending the serpentine air flow passages radially-outwardly adjacent the suction sidewall side of a root of the airfoil;
  (b) positioning the first 180 degree turn at a tip of the airfoil;
  (c) extending the serpentine airflow passages radially-inwardly adjacent a center passage of the airfoil;
  (d) positioning the second 180 degree turn at the root of the airfoil; and
  (e) extending the serpentine flow passages radially-outwardly adjacent the pressure sidewall side of the airfoil.

9. A method according to claim 6, wherein the airfoil comprises a turbine blade.

10. A method of forming an airfoil, comprising:
  (a) positioning first and second double-side lateral impingement circuit cores in a mid chord region of the airfoil and defining a central passage adapted for cooling air flow therethrough, and into impingement with suction side and pressure side air flow passages;
  (b) defining an air flow passage in the first and second circuit cores to an exit for air flow through film cooling holes and tip holes in the airfoil; and
  (c) positioning the first and second circuit cores between a leading edge core and a trailing edge core to define a cooling core.

11. A method according to claim 10, wherein each circuit is individually formed from a single core.

12. An airfoil according to claim 10, wherein the airfoil comprises a turbine blade.

13. A method of forming an airfoil, comprising the steps of:
  (a) forming at least first and second axially-stacked circuit cores, each circuit core including multiple airflow passages positioned laterally between a pressure sidewall side and a suction sidewall side of respective ones of the circuit cores, each of the circuit cores formed by a separate core and fabricated from a ceramic material;
  (b) enveloping the stacked cores in a wax form shaped to a predetermined configuration of the airfoil;
  (c) repeatedly dipping the wax form into a liquid ceramic solution to incrementally form a ceramic shell of a required thickness on the surface of the stacked core;
  (d) melting the wax out of the ceramic shell to form a mold comprising the stacked ceramic core, the external ceramic shell and a void previously filled with the wax;
  (e) filling the void with molten metal;
  (f) after solidification and cooling of the metal, removing the shell to expose the metal airfoil in the shape of the void; and
  (g) removing the internal ceramic core to define the internal cooling circuit of the airfoil.

14. A method according to claim 13, and including the step of positioning the stacked circuit cores between a leading edge core and a trailing edge core.

15. A method according to claim 13, wherein at least one of the stacked cores comprises a core that defines a respective cooling circuit having a serpentine flowpath.

16. A method according to claim 13, wherein at least one of the stacked cores comprises a core that defines an impingement cooling circuit.

17. A method according to claim 15, wherein the step of forming at least first and second axially-stacked circuit cores comprises the step of forming first and second stacked cores defining first and second cooling circuits having respective first and second serpentine flow paths.

18. A method according to claim 17, wherein the step of forming first and second stacked cores includes the step of positioning the stacked cores whereby the serpentine cooling circuits defined thereby comprise flowpath directions selected from the group of directions consisting of airflow from the pressure side of the airfoil to the suction side of the airfoil and from the suction side of the airfoil to the pressure side of the airfoil.

* * * * *